United States Patent [19]
McCloskey

[11] Patent Number: 4,713,591
[45] Date of Patent: Dec. 15, 1987

[54] CONTROL AND DRIVE ARRANGEMENT FOR MOVABLE MEMBERS

[76] Inventor: Paul S. McCloskey, 50 Carters Road, Dural, N.S.W., Australia, 2158

[21] Appl. No.: 900,153

[22] PCT Filed: Nov. 29, 1985

[86] PCT No.: PCT/AU85/00296
§ 371 Date: Jul. 30, 1986
§ 102(e) Date: Jul. 30, 1986

[87] PCT Pub. No.: WO86/03249
PCT Pub. Date: Jun. 5, 1986

[30] Foreign Application Priority Data
Nov. 30, 1984 [AU] Australia .............. PG8373

[51] Int. Cl.[4] .............................................. G05D 3/12
[52] U.S. Cl. .................................. 318/257; 318/282; 318/266; 318/286; 318/468
[58] Field of Search ............... 318/256, 257, 264, 265, 318/266, 282, 283, 286, 461, 466, 467, 468, 470

[56] References Cited
U.S. PATENT DOCUMENTS

| | | | |
|---|---|---|---|
| 3,891,909 | 6/1975 | Newson | 318/282 X |
| 3,893,695 | 7/1975 | Rickert | 318/369 X |
| 4,092,575 | 5/1978 | Ogishi et al. | 318/282 |
| 4,234,833 | 11/1980 | Barrett | 318/286 X |
| 4,236,106 | 11/1980 | Davis et al. | 318/286 X |
| 4,312,033 | 1/1982 | Sweeney et al. | 318/594 X |
| 4,471,274 | 9/1984 | Ross et al. | 318/282 |
| 4,529,920 | 7/1985 | Yoshida et al. | 318/468 X |
| 4,565,954 | 1/1986 | Yamanishi et al. | 318/282 X |

FOREIGN PATENT DOCUMENTS
0063466 10/1982 European Pat. Off. .

*Primary Examiner*—William M. Shoop, Jr.
*Assistant Examiner*—Bentsu Ro
*Attorney, Agent, or Firm*—Stevens, Davis, Miller & Mosher

[57] ABSTRACT

A controller for controlling the movement of a member such as a sliding door driven by a motor. The door is controlled by the use of a motion detector coupled with the door. Pulses from the motion detector are counted by control circuitry, and the door is moved at a reduced speed in the region of its limits of travel. The limits are defined by the number of pulses from the motion detector equalling a predetermined value. The motor is de-energized if a stationary state of the door is detected in the low speed region, and reversed if a stationary condition is detected in the remainder of its movement.

9 Claims, 6 Drawing Figures

CONTROL AND DRIVE ARRANGEMENT FOR MOVABLE MEMBERS

TECHNICAL FIELD

This invention relates to the control of the movement of a member between first and second positions. The invention has particular application to the control of electrically operated doors and similar devices such as curtains, windows and other devices which are required to be moved between open and closed positions in response either to simple actuating commands, or to a complex set of command functions.

The invention has particular application to the control of electrically operated doors of the kind which are mounted for sliding within the cavity of a wall adjacent the door opening, such doors being employed in domestic or commercial buildings.

Objects of the invention include the provision of a self-commissioning mode of operation, automatic retraction upon the sensing of an obstacle, and a control system which facilitates the employment of a wide range of optional behaviour modes for such purposes as security, energy management, and fire response.

BACKGROUND ART

Japanese patent publication No. 55-19366 discloses an automatic door operating system in which the distance of travel of the door from its rest position is determined by counting pulses generated so as to be proportional to the number of rotations of the driving motor, and the door is controlled by comparing the pulse count with a pre-set value corresponding to the total length of travel of the door.

Such an arrangement represents a significant advance over earlier prior art systems where devices such as limit switches were employed to define the door travel, but does not provide for a self-commissioning operation, in particular requiring the total door travel to be pre-set.

DISCLOSURE OF INVENTION

In one broad form the present invention comprises means controlling the movement of a member between first and second positions by drive means coupled with said member, said control means comprising:

(a) counting pulse generating means coupled with said member to provide counting pulses only during movement of said member, (b) counting means receiving and counting said counting pulses to provide a pulse count indicative of the position of said member relative to said first position, (c) means generating a pulse count corresponding to a third position of said member between said first and second positions, (d) comparator means comparing said position indicative pulse count and said third position pulse count, (e) motion indicator means responsive to said counting pulse generating means to register a moving or stationary condition of said member, (f) speed control means responsive to said comparator means to set the speed at which said member is driven to a first speed when said member is between said first and third positions and to a second speed when said member is moving towards said second position and is between said second and third positions, and (g) drive stopping means responsive to said comparator means and to said motion indicator means to deactivate said drive means when movement of said member toward said second position is arrested while said member is between said second and third positions, In a preferred form, the invention further comprises drive reversing means responsive to said comparator means and said motion indicator means to reverse said drive means when movement of said member towards said second position is arrested when said member is between said first and third positions.

Thus a characteristic of the present invention is that the total distance of travel of the door is not a factor in determining its operation, so there is no requirement during installation for accurate setting of the total distance of travel.

Furthermore, rather than determine door position by counting revolutions of the drive motor, in the present invention this is determined by counting pulses directly related to door movement. The combination of these control features enables a particularly advantageous embodiment of the invention, suited to the operation of light doors such as domestic sliding door, where a clutch device is incorporated in the drive mechanism so that the motor can continue to run upon an obstruction being encountered, and can be over-ridden in emergency manual operation of the door.

The invention will now be described by way of example only, with reference to an embodiment illustrated in the accompanying drawings.

MODE FOR CARRYING OUT THE INVENTION

Figure 1:
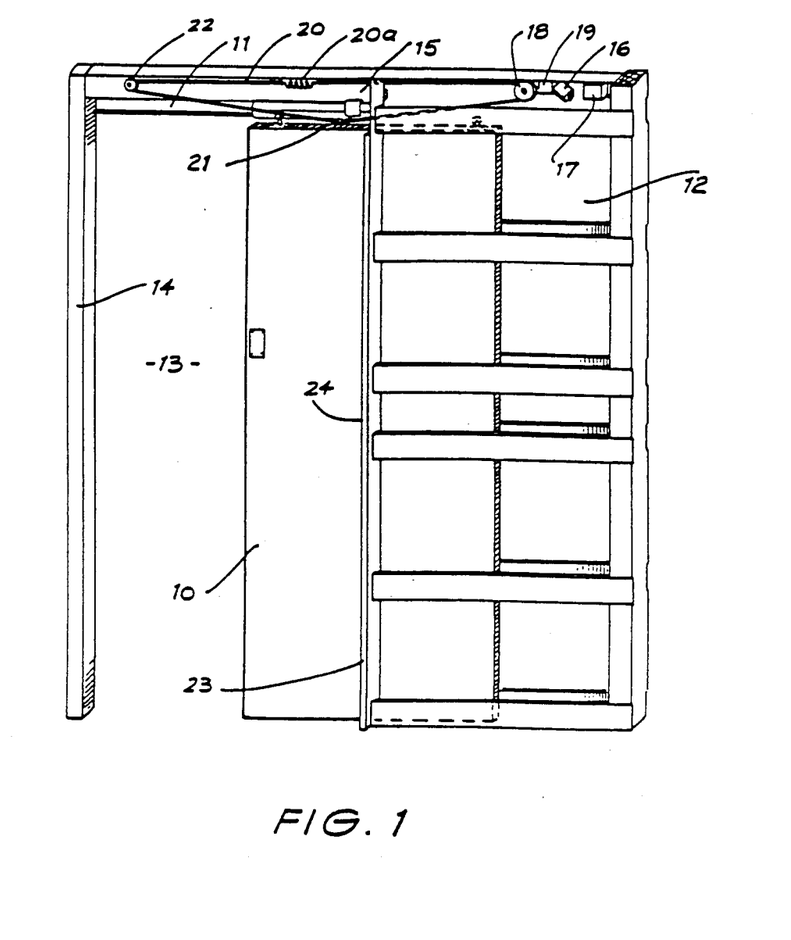
FIG. 1 is a schematic side elevation of a door installation incorporating the present invention.

As shown in FIG. 1 a sliding door 10 is mounted for reciprocation on a supporting rail 11, the rear portion of the rail 11 being supported within the cavity 12 of a cavity wall, while the forward portion of the rail 11 extends over a doorway 13 towards the door-jamb 14. The door operating mechanism and control circuitry is mounted on a mounting plate 15 which extends above the doorway 13 and the cavity 12, and this mechanism essentially comprises an electric motor 16, preferably a low voltage DC motor for example of the kind used for driving the electrically operated windows of motor cars, a motor power supply 17 which preferably comprises a rechargable battery and a trickle charger, a drive pulley 18 which is driven by the electric motor through a gearbox 19, a drive belt 20 engaged with the door 10 at 21, and an idler pulley 22. The drive belt 20 incorporates a helical tension spring 20a. Circuit boards and electronic components are also mounted on the plate 15, typically at 23 and 24.

The mounting of the sliding door and the mounting of the equipment within the cavity employs conventional techniques and will not be described further. On the face of the inner door-jambs 23 on each side of the door there are preferably located touch sensors 24, which are connected with the control circuitry as described below.

The control circuitry will be described herein largely in terms of functions, rather than in terms of hardware, as the control behaviour in question may be achieved by hard-wired systems or by the use of software.

Figure 2:
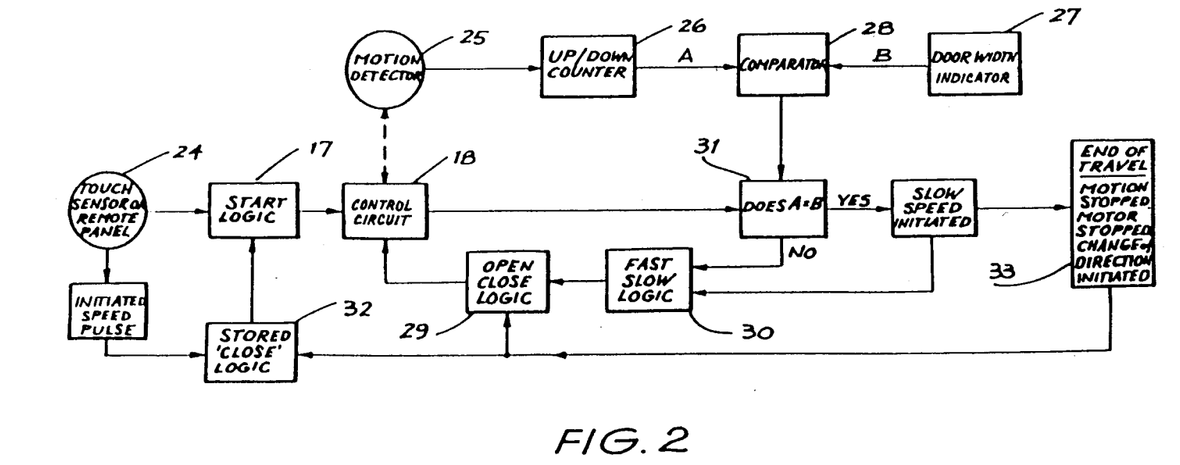
FIG. 2 is a block diagram showing the logic sequences involved in the opening movement of the door of FIG. 1.

FIG. 2 shows the sequences involved in the initiation and control of opening movement of the door. A motion detector 25, which may consist of a reflective type opto-interrupter mounted to scan white bars printed on the idler pulley 22, produces a series of pulses when the door is in motion. The output of the motion detector is applied to an up/down counter 26 which may conveniently comprise a pair of 4-bit counters. The state of the counter 26 will therefore provide an indication of the distance which the door has travelled from rest.

A door width indicator 27 provides a digital signal indicative of a distance of travel which is somewhat less than the total length of travel of the door between the open and closed positions, for the particular width of doorway in which the unit is installed. This door width indicator may conveniently comprise an 8-bit D.I.L. (dual-in-line package) switch. The outputs A and B of the up/down counter 26 and the door width indicator 27, are compared by comparator 28.

Upon the actuation of one of the touch sensors 24, or upon the generation of an opening signal by remote circuitry described below, the drive motor 16 is actuated by start logic circuitry 17 and motor control circuit 18. The motor control circuit is influenced in turn by an open/close logic circuit 29 which controls the direction of rotation of the drive motor, and by a fast/slow logic circuit 30 by which the motor control circuit 18 constrains the motor to run at a fast or a slow speed. The open/close logic circuit 29 may conveniently comprise a flip-flop which is clocked to change the direction of travel of the door on its next operation, while the fast/slow logic circuit 30 may comprise gates which respond to the output of the comparator 28 as shown by the logic functions at 31.

It will be appreciated that it is desirable to have the door travel at its high speed for most of the length of travel, and then to switch to a low speed immediately prior to reaching the end of its travel. Thus, while the motor 16 is activated, the comparator output is monitored and when the state of counter 26 as indicated by its output signal A, becomes the same as the state of the door width indicator 27 as indicated by its output signal B, then slow speed operation is initiated.

When the door reaches the end of its travel and contacts the door-jamb, the output of the motion detector 25 will cease, but the motor 16 will continue to rotate, the tension in the belt 20, controlled by the tensions spring 20a, allowing slippage relative to the drive pulley 18. In the normal mode of operation loss of output from the motion detector while the motor 16 is operating at its slow speed will result in the motor being deactivated and the door will become stationary in its open position. Should however a command to reclose the door have been stored in the stored close logic circuit 32, which may comprise a flip-flop activated by a second pulse from the touch sensor at the time of initial actuation, then upon the detection of motion stopped by the circuit 33, not only will the open/close logic circuit 29 be activated to ready the door for reverse movement, but also the stored close logic circuit 32 will be activated immediately to restart the motor, which will then drive the door through a closing sequence.

Figure 3:
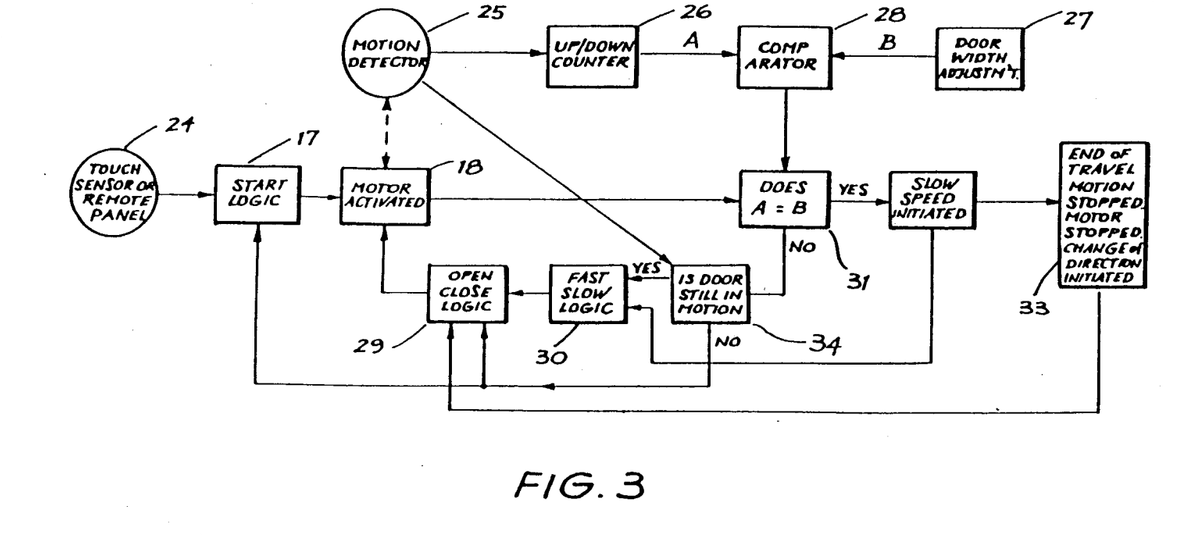
FIG. 3 is a block diagram showing the logic sequences involved in the closing movement of the door of FIG. 1.

FIG. 3 shows the elements and sequences involved in closing operation of the door. Assuming the door to be in the fully open position, the closing sequence is initiated by actuation of one of the touch sensors 24, by a start signal from remote circuitry, or of course by the actuation of the start logic circuit 17 by the stored close logic 32. When the count of the up/down counter 26 reaches the preset count of the door width indicator 27, slow speed operation is initiated, and as in the opening sequence, when the door stops upon reaching the fully open position the motor is deactivated and the open/close logic 29 reset.

Motion of the door is monitored throughout its movement by means of the output of the motion detector, and the presence or absence of door movement is related to the door positon in the logic function shown at 34. Should the output signal from the motion detector 25 cease while the door is in the major part of its movement, that is to say before the up/down counter reaches the preset count of the indicator 27, then the open/close logic and start logic circuits 29 and 17 will immediately be activated, to reverse the direction of the drive motor 16, in response to what is of course in this way detected as an obstruction in the doorway. Should an obstruction be encountered after the signal A has reached the count of signal B, and the door has been switched to its slow speed, then the motor will simply be deactivated, so that small obstructions close to the end of movement of the door will not result in reversal and reopening.

Figure 4:
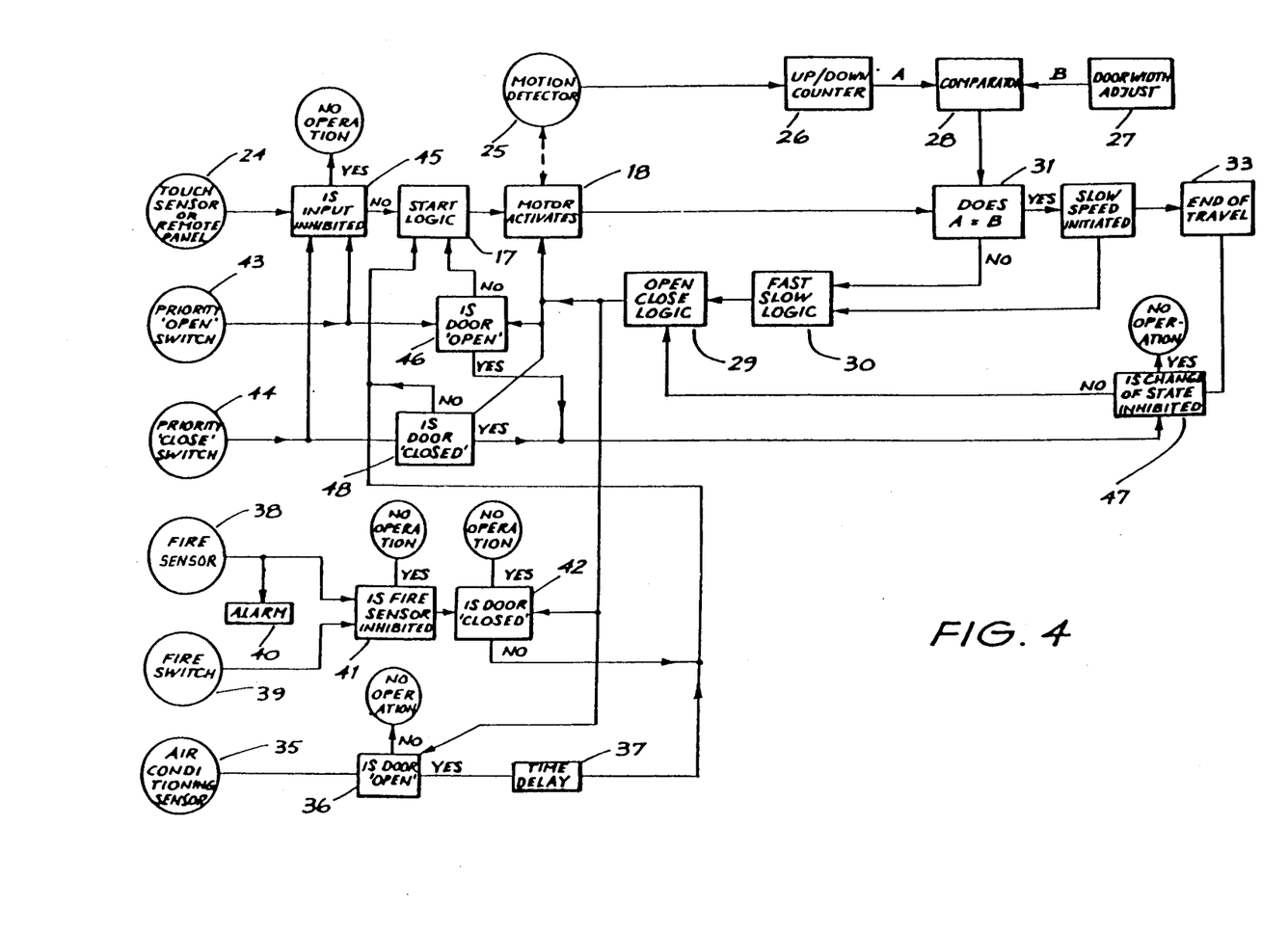
FIG. 4 is a block diagram illustrating the logic sequences associated with priority commands, in the operation of the door of FIG. 1.

The circuit functions providing priority command sequences are set out in FIG. 4. Firstly it may be noted that an air-conditioning sensor input 35 is provided, which may be connected with an air-conditioning unit, so that if this unit is running and the door has been left open, the door will be closed automatically after a set delay. In the logic function at 36, the state of the direction of travel flip-flop in the open/close logic 29 is monitored, and the start logic 17 is activated if necessary, after a delay provided by time delay circuit 37.

Two fire sensor inputs are provided. The first of these 38 is intended for a local or room fire detector, while the second of these inputs 39 is intended for connection to the general alarm system. A fire alarm device 40 may be incorporated with the door, and operated by the local fire sensor input 38, and by the fire sensor input 39 if so desired. Preferably, a fire sensor inhibit input (not shown) is provided, and response to an actuating signal at either of the inputs 38 and 39 will be prevented should this inhibit function be activated. Signals from the inputs 38 and 39 are applied to fire sensor inhibit gate circuitry 41, and then gated in the logic circuit 42 with the state of the motor direction flip-flop in the open/close logic circuit 29, and the start logic circuit 17 is controlled accordingly.

In the preferred form of the equipment, each door which incorporates a control arrangement according to the invention, is associated with a central remote control panel which may be under the control of the building supervisor. The remote control panel has displays showing the condition of operation of each door as well as controls enabling manual closing or opening of the door from the panel. In addition, each panel may be provided with "priority open" and "priority close" controls, and corresponding inputs 43 and 44 are provided in the door control circuitry and are shown in FIG. 4. Inhibit circuitry is provided between the touch sensor or remote panel input 24 and the start logic circuit 17, the logical operation of this circuitry being shown at 45. Actuation of the "priority open" switch at the control panel will inhibit the touch sensors or remote control switches, and by means of the logical functions shown at 46 and 47, a change of state of the forward/reverse flip-flop in the open/close logic circuit 29 will be inhibited when this is in the door open state, while door actuation will occur if the door is in its closed or closing state upon actuation of the "priority open" switch.

Similarly, by means of the inhibit function 45, and the logical functions shown at 47 and 48, actuation of the "priority close" switch will inhibit the touch sensor input or remote control input and ensure that the door closes or returns to a closed positon after other actuation. If the door is forced, the alarm will be activated, and the door will cycle through an opening and closing movement.

Particularly in its domestic application, the drive mechanism of the door is designed so that damage to the door or its mechanism will not occur due to mishandling, and so that should a power failure occur and in the event of battery back-up failure, the door can still be operated manually. This is simply achieved by the tension in the drive belt being such that the belt can slip on the pulley should the door be forced manually. Such a clutch-like action is required in any case to enable the door to stop upon striking an obstruction, and to allow the motor to run momentarily after the door reaches the end of its travel. A further advantage of the control arrangements described above is that if the door is forced open when the system is operating, the motor will be actuated in response to the presence of pulses from the opto-interrupter, and the door will open under power.

It is preferred that the touch sensors 24 are each provided with indicators showing the state of the control circuitry. Thus, each may be provided with a green and a red light-emitting diode, the green being activated when an open command has been registered or when the door is open, the red being activated by a close command and remaining red while the door is closed. Where the system is in one of its special modes, this can also be shown. For example, when the air-conditioning sensor input 35 is activated, the red LED's of the touch sensors can be flashed to show that the door will close after a delay.

As mentioned above, the control behaviour of present invention may be embodied in hardware or may be achieved by a microprocessor with software based on the logical functions described above.

Figure 5:
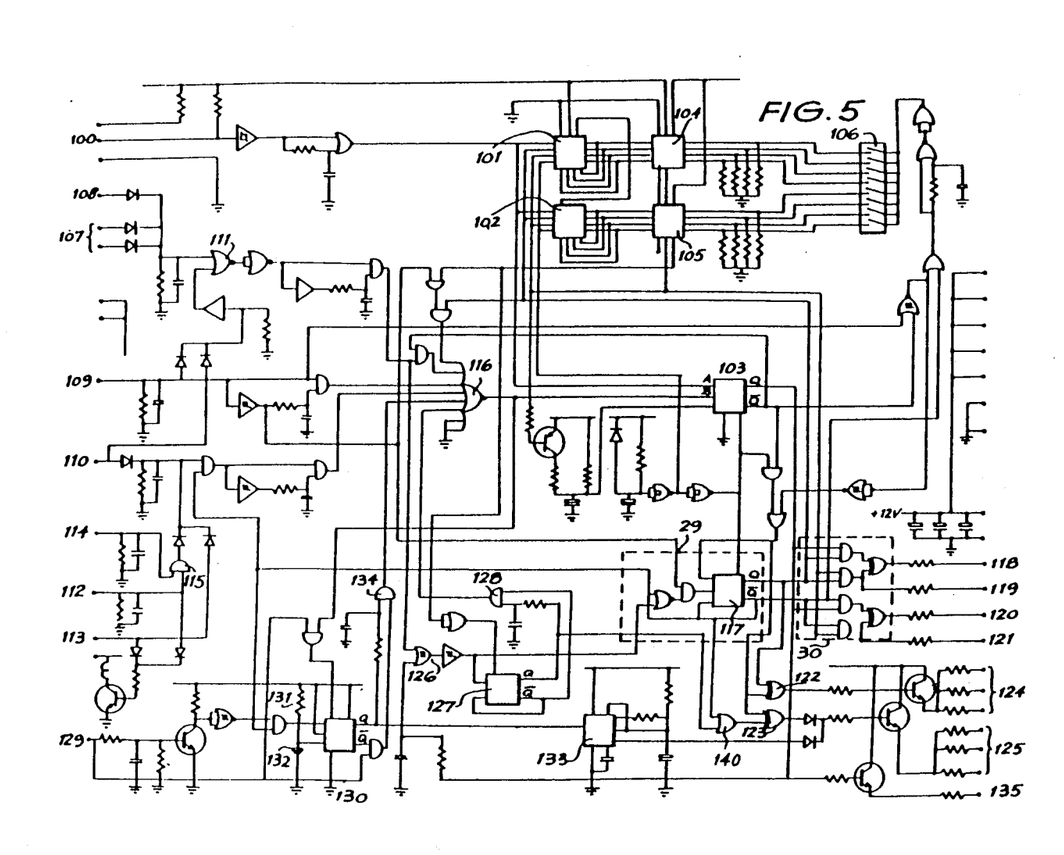
FIG. 5 is a schematic circuit diagram of a control embodying the invention.

A hardware embodiment of the main features of the present invention is illustrated in the schematic diagram of FIG. 5, which shows the control circuitry suitable for use in the arrangement illustrated in FIG. 1, the circuitry illustrated receiving input signals from the various control devices such as the touch sensors or remote panel, air-conditioning sensors, priority open, and close switch and fire detectors, and which provides outputs for the control of motor drive circuitry, and for the provision of indication of the state of the control system, by the use of LED indicators.

The clock signal from the opto-interrupter 25 arrives at input pin 100 and after pulse shaping is applied to the clock input of a pair of 4-bit up-down counters 101 and 102 and to the A clock input of a re-triggerable monostable 103 which will be referred to below. The counter 101, 102 is coupled with a pair of 4-bit comparaters 104, 105 where the accumulated count from the opto-interrupter 25 is compared with the setting of a DIL switch 106.

Output signals from the touch sensors are applied to the inputs 107 and from the manual control at the remote panel to the input 108. A priority open signal, if applicable, is applied to the input 109, while the input 110 receives a priority close signal if this has been selected at the remote panel. The inputs 109 and 110 are gated at 111 with the touch sensor or manual inputs 107 and 108, to inhibit the latter signals in the presence of either priority signal.

Two fire sensor inputs are provided, 112 and 113. The second of these is coupled directly with the priority close input 110, and thus functions as a non-overridable local fire sensor input, while the input 112 may be inhibited by a signal at the fire sensor inhibit input 114 which is gated with the input 112 at 115.

The input commands derived from these various input pins are combined in an eight input NOR gate 116, the touch sensor or manual command signal after gating with the monostable 103, and the priority close command after gating with the outputs of a "D" type flip-flop 117 the state of which determines the direction of travel of the door. The output of the gate 116 is applied to the "B" clock input of the monostable 103, the "Q" output of which is applied to the fast/slow logic circuit 30 which also receives signals from the comparator 104, 105 and the direction of travel flip-flop 117, which forms part of the open/close logic circuit 29. The outputs from the fast/slow logic gate circuitry 30 for the motor control circuitry (not shown) are a fast forward output 118, slow forward output 119, fast reverse output 120 and slow reverse output 121.

Exclusive OR gates 122 and 123 respectively detect the door opening and door closing conditions of the door control logic, and control respective groups of outputs 124 and 125 for the green LED indicators of the touch sensor panel and the remote panel, and the red LED indicators of the remote panel and the touch sensors.

The "Q" output of the monostable 103 is also applied to a NAND Schmitt trigger 126, where it is coded with the manual or touch sensor input command signal and applied both to the open/close logic 29, and to the clock pin of a "D" type flip-flop 127. This functions together with AND gate 128 as the stored "close" logic circuit 32. The gated output of the flip-flop 127 are applied to the input command combining gate 116, and the "Q" output of the flip-flop 127 is also applied to an exclusive OR gate 140 to activate the door closing red LED indicators. Thus until the flip-flop 127 is cleared by closure of the door, the motor start logic monostable 103 will remain activated, and the open/close logic circuit 29 will be placed in its door closing condition upon completion of the door opening phase, this providing the automatic closure function described above.

A further input 129 is provided for the air-conditioning sensor referred to earlier. A re-triggerable monostable receives the air-conditioning sensor signal after gating with the direction of travel signal from the flip-flop 117, and by means of a time delay circuit consisting of resistor 131 and capacitor 132, controls a timer 133 which, for a time delay set by the values of 131 and 132, will provide a pulse signal to the red door closing LED output circuits 125, and upon expirey of this delay, will initiate door closing action via gate 134 and input command combining gate 116.

The signal outputs of the circuit illustrated in FIG. 5 are completed by output 135 which provides an indication of the motor running condition.

Figure 6:
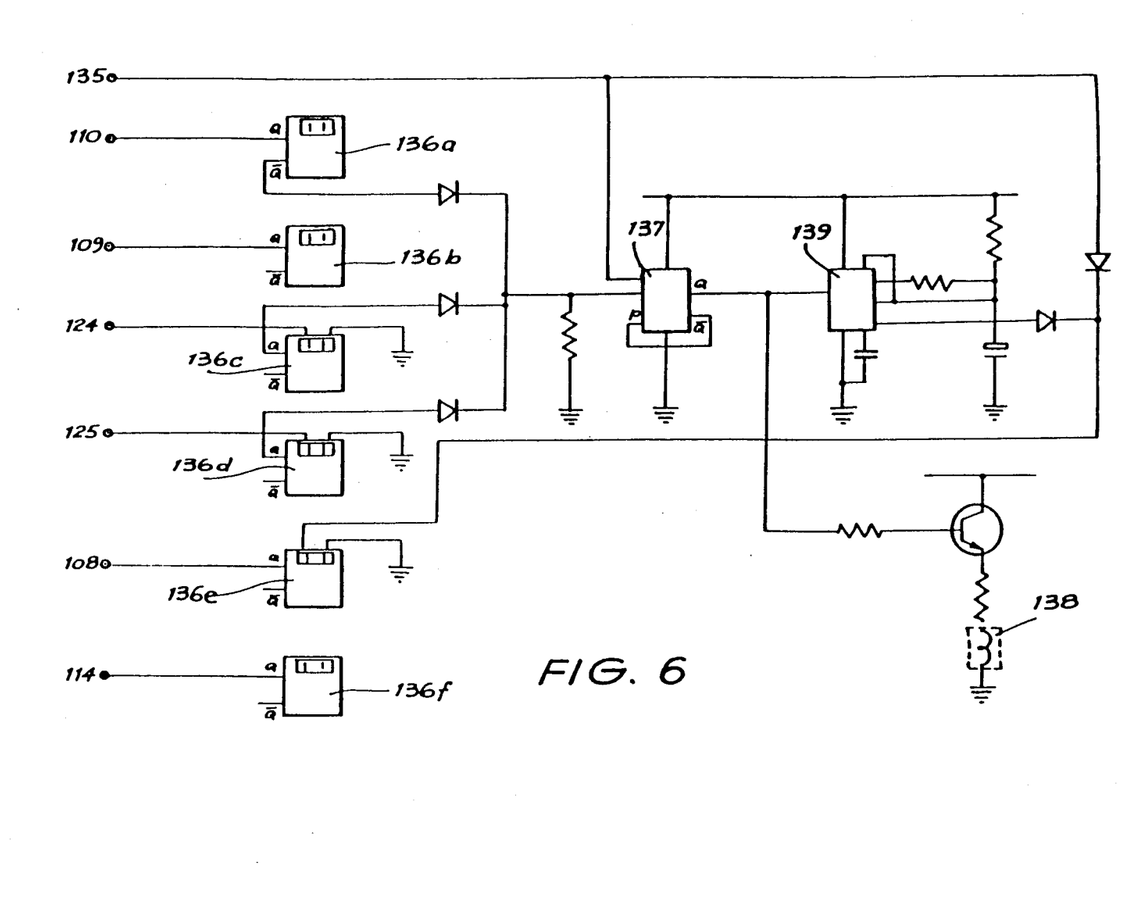
FIG. 6 is a schematic circuit diagram of a remote panel.

The remote control panel circuit for a given door is shown in FIG. 6. Logic level switches 136a to 136f control the priority close output 110, priority open output 109, manual change of state output 108, and fire sensor inhibit 114, and respond to the open and close motion indication inputs 124 and 125.

The motor run indicating signal at 135 is applied to the clock pin of a "D" type flip-flop 137 which is normally held in reset mode by the logic level switches 136a, c and d, so that in the absence of an opening or closing operation and the presence of a priority close condition enabling the flip-flop 137, the motor run indicator signal will drive the flip-flop 137 to actuate an alarm buzzer 138, and flash the motor run indicator under the control of timer 139, alerting the supervisor to the forcing of the door.

It will also be appreciated that while the invention has been described with the aid of an exemplary embodiment, the principles of operation discussed herein may be realized in other ways, and the invention is not to be regarded as limited by the description of its embodiments.

I claim:

1. A controller for controlling the movement of a member between first and second positions by drive means coupled with said member, said controller comprising:
   (a) counting pulse generating means coupled with said member to provide counting pulses only during movement of said member,
   (b) counting means receiving and counting said counting pulses to provide a pulse count indicative of the position of said member relative to said first position,
   (c) means generating a pulse count corresponding to a third position of said member between said first and second positions,
   (d) comparator means comparing said position indicative pulse count and said third position pulse count,
   (e) motion indicator means responsive to said counting pulse generating means to register a moving or stationary condition of said member,
   (f) speed control means responsive to said comparator means to set the speed at which said member is driven to a first speed when said member is between said first and third positions and to a second speed when said member is moving towards said second position and is between said second and third positions, and
   (g) drive stopping means responsive to said comparator means and to said motion indicator means to deactivate said drive means when movement of said member toward said second position is arrested while said member is between said second and third positions.

2. A controller according to claim 1 further comprising drive reversing means responsive to said comparator means and to said motion indicator means to reverse said drive means when movement of said member towards said second position is arrested when said member is between said first and second positions.

3. A controller according to claim 1 wherein said drive means comprises a drive motor and drive motor coupling means allowing relative movement between said motor and said member whereby said motor may continue to run upon arresting of said member and whereby said member may manually be moved while said motor is unactivated.

4. A controller according to claim 3 wherein said member is a door, said controller further comprising circuit means responsive to manual actuation to establish a door operate command signal, means establishing a door open and door closed condition, and means responsive to said command signal to close or open said door.

5. A controller according to claim 4 further comprising means establishing a priority open signal, means responsive to said priority open signal to initiate opening movement of the door when the door is in its closed position.

6. A controller according to claim 4 further comprising means establishing a priority close signal, means responsive to said priority close signal to initiate closing movement of the door when the door is in its open position.

7. A controller according to claim 6 comprising a fire detection means and for receiving from fire detection means a signal indicative of the presence of a fire, means establishing a fire condition signal, and means coupling said fire condition signal with said means responsive to said priority close signal.

8. A controller according to claim 6 further comprising delayed closure means responsive to a delayed closure signal to supply a command signal to said means responsive to said priority close signal after a predetermined delay.

9. A controller according to claim 3 futher comprising override alarm means, means detecting the presence of counting pulses in the absence of actuation of said motor and means responsive thereto to actuate said motor and said override alarm means.

* * * * *